United States Patent [19]

Cully et al.

[11] Patent Number: 5,061,502

[45] Date of Patent: Oct. 29, 1991

[54] PROCESS FOR THE REMOVAL OF TERPENES FROM ESSENTIAL OILS

[75] Inventors: Jan Cully; Erwin Schütz, both of Trostberg; Heinz-Rüdiger Vollbrecht, Altenmarkt, all of Fed. Rep. of Germany

[73] Assignee: SKW Trostberg Aktiengesellschaft, Trostberg, Fed. Rep. of Germany

[21] Appl. No.: 419,643

[22] Filed: Oct. 11, 1989

[30] Foreign Application Priority Data

Oct. 14, 1988 [DE] Fed. Rep. of Germany ....... 3834988

[51] Int. Cl.[5] .............................................. B01D 15/00

[52] U.S. Cl. .................................... 426/422; 210/673; 210/690; 426/423; 426/651

[58] Field of Search ....................... 210/670, 673, 690; 426/423, 651, 422

[56] References Cited

U.S. PATENT DOCUMENTS

| | | | |
|---|---|---|---|
| 2,712,008 | 6/1955 | Kirchner et al. | 426/651 |
| 3,294,550 | 12/1966 | Ikeda et al. | 426/423 |
| 4,647,466 | 3/1987 | Japikse et al. | 426/475 |

*Primary Examiner*—Ivars Cintins
*Attorney, Agent, or Firm*—Felfe & Lynch

[57] ABSTRACT

Terpenes are removed from essential oils by (a) contacting terpene-containing essential oils with a polar solid (adsorbent);

(b) separating the loaded adsorbent from the liquid phase enriched with terpenes; and (c) subjecting the adsorbent loaded with essential oils to an extraction with compressed carbon dioxide.

12 Claims, No Drawings

PROCESS FOR THE REMOVAL OF TERPENES FROM ESSENTIAL OILS

FIELD OF THE INVENTION

The present invention is concerned with a process for the removal of terpenes from essential oils in a three-step process.

BACKGROUND OF THE INVENTION

Essential oils are important aroma substances in the foodstuff industry. Thus, for example, cold-pressed oils from citrus fruits are used to a large extent for the production of essences for the beverage industry, as well as for the aromatization of bakery products. These essential oils frequently contain terpene hydrocarbons of the mono- and sesquiterpene series which have only a limited storage stability and are thermolabile and, in addition, display a smaller aroma intensity than the actual aroma material which is preponderantly composed of volatile oxygen-containing compounds, such as aldehydes, ketones, esters, acids, phenols, alcohols and lactones. For these reasons, the removal of the terpenes is an important step for the improvement of the storage stability and for intensifying the aroma intensity of essential oils.

Furthermore, by the removal of the non-polar terpene hydrocarbons, the water-solubility of the essential oils is improved, which is of particular importance for the beverage industry.

A number of processes are known for the removal of terpenes from of essential oils which, for the separation of the terpenes, utilize differences in the vapor pressure, in the polarity or in the solubility of the terpene components in comparison with the oxygen-containing compounds. All these processes possess certain disadvantages which manifest themselves either in the quality of the product, in the process costs or in the yields. Thus, for example, there has been described the dissolving of essential oils in aqueous alcohols, the terpenes thereby separating out, followed by the recovery of the desired aroma fractions by salting out or by liquid-liquid extraction. In the case of this process, the separation action and the yields are not satisfactory. Furthermore, depending upon the nature of the extraction agent used, technical or environmental problems can arise.

Chromatography is a further known method, for example for the enrichment of citrus oils. These processes are very laborious and expensive since it is necessary to work with very dilute solutions. Furthermore, in the case of the subsequent evaporation of the solutions, there is a danger of the thermal decomposition of the sensitive component materials or of the loss of the low boiling aroma materials.

The removal of terpenes by means of rectification or distillation in a vacuum, as well as steam distillation, are also widely used methods. These processes do not provide high quality products since the aroma components are considerably damaged by the thermal stressing.

In contradistinction thereto, processes of high pressure extraction for the enrichment of essential oils, which recently became known, are substantially more gentle. Thus, for example, in Chem. Ing. Tech., 56, 794/1984, there is described a process for the removal of terpenes from citrus oils in which the citrus oils are subjected to a countercurrent extraction with carbon dioxide at 70 to 90 bar and at about 55° to 85° C. in a counterflow column to which is applied a temperature gradient. With the help of countercurrent extraction there can be achieved either high rates of enrichment or high yields but not both together (cf. Food Technology, 6, 145/1988) since either the selectivity of the process is small or the loading of the carbon dioxide with terpenes is low.

Finally, in U.S. Pat. No. 4,647,466, there is described a process for the extraction of readily volatile oxygen-containing materials, such as ethyl butyrate or hexanal, from citrus oils with the help of compressed gases, limonene thereby being enriched. However, since citrus oils, for example orange oils, consist of up to 95% limonene, very large amounts of carbon dioxide or long extraction times are necessary for carrying out the process in order to remove from the aroma oil a high proportion of limonene with the necessary selectivity.

OBJECTS OF THE INVENTION

Therefore, it is an object of the present invention to provide a process for the removal of terpenes from essential oils which does not display the disadvantages of the prior art but rather, with low technical expense and under mild conditions, makes possible a selective enrichment of the essential oils with good yields.

DESCRIPTION OF THE INVENTION

Thus, according to the present invention, there is provided a process for the removal of terpenes from essential oils, wherein a) the terpene-containing essential oils are contacted with a polar solid (adsorbent), b) the loaded adsorbent is separated from the liquid phase enriched with terpenes and c) the adsorbent loaded with essential oils is subjected to an extraction with compressed carbon dioxide.

Surprisingly, we have found that in this way a substantial removal of the terpenes is achieved and, at the same time, the essential oils can be obtained in high yield and with good quality.

The process according to the present invention comprises at least three steps. In the first step a), the terpene-containing essential oils are contacted with a polar solid (adsorbent). In the scope of the present invention, in principle there can be used all terpene-containing essential oils. In particular, citrus oils can be used which have been obtained from citrus fruits, for example, oranges, lemons, tangerines, citrons, limes, grapefruit and cravos. However, other aromatic oils, such as hop, carnation, laurel, ginger, peppermint and cedar wood oils can also be used. Instead of the pure essential oils, there can also be used carbon dioxide extracts or oleoresins. Depending upon their nature and origin, the essential oils have terpene contents of up to 95%.

The loading of the adsorbent with the essential oils can take place according to known methods, for example by simple mixing. As polar adsorbents, there can be used the solid materials conventional for this purpose, for example silica gel, aluminum oxide, kieselguhr, cellulose, bentonite, magnesium silicates and the like. Silica gel and aluminum oxide have thereby proved to be especially advantageous.

The amount of the polar adsorption agent can be varied within wide limits but it is preferred to use 10 to 60% by weight of polar adsorbent, referred to the initial amount of essential oils. In the case of this loading of the adsorbent according to step a), the greater part of the oxygen-containing aroma materials are adsorbed on the solid material, whereas the terpenes remain substantially in the liquid phase. Depending upon the nature of the aroma oil used and the amount of adsorbent employed, about 60 to 95% of the aroma materials are adsorbed.

In the second step b) of the process according to the present invention, there then takes place the separation of the adsorbent loaded with the aroma materials from the terpenes remaining in the liquid phase. The methods which are usual for the separation of solid materials from liquids can thereby be used. Because of the rapid and complete separation, there is hereby preferably used centrifuging. However, in the case of this step, other separation processes, for example filtration, can readily be employed. In this way, as a rule the main amount of the terpenes contained in the essential oils can already be removed without it resulting in noticeable losses of the valuable aroma materials.

In general, the adsorbent can be used several times for the adsorption. In the case of the adsorption, it is possible to increase the yield of aroma materials by first mixing the adsorbent with the terpene fraction of a previous batch and then separating off as described above. In this case, the mixture of terpene fraction and adsorbent can be filled into a column and the essential oils to be enriched passed therethrough in the manner of column chromatography.

In the following step c), the adsorbent loaded with aroma components is subjected to a high pressure extraction with compressed carbon dioxide, the aroma materials thereby being desorbed or extracted. The high pressure extraction should take place at pressures above 70 bar and at a temperature of from 10° to 80° C. in order to achieve a complete extraction of the aroma materials. Preferred extraction conditions are to be regarded as being pressures of $>100$ bar and especially of 200 to 300 bar and temperatures of from 30° to 70° C. because, under these conditions, the aroma materials can be obtained especially quickly and gently. It is clear that, in the case of this high pressure extraction, apart from the desired aroma materials, the residue of terpenes is also co-extracted which was co-adsorbed on the polar adsorbent in the first step.

Therefore, if it is desired to achieve a practically complete removal of the terpenes from the essential oils, in a preferred embodiment of the process according to the present invention, before the high pressure extraction (step c)) for obtaining the aroma materials, there is carried out a pre-extraction in which the residual terpenes are first removed from the adsorption agent. This pre-extraction is also carried out with compressed carbon dioxide but, in contradistinction to the process conditions of step c) (main extraction), at pressures below 100 bar and preferably at 70 to 90 bar.

The temperature range for the pre-extraction is from 30° to 80° C. and preferably 50° to 70° C. Under these process conditions, a substantially selective extraction of the terpenes takes place, whereas the aroma materials remain behind on the adsorbent. The terpene hydrocarbon content of these pre-extracts generally lies above the terpene content of the starting oil. Then, as already described, this pre-extraction is followed by the main extraction (step c)) in which the oxygen-containing aroma materials can then be obtained under gentle conditions. The carbon dioxide aroma extracts obtained in this way can then be completely separated from the carbon dioxide in the usual manner by lowering the density of the carbon dioxide. In this way, it is possible to obtain highly concentrated extracts of essential oils with low terpene contents (reduction of the terpenes by 95%) in high yields, which display a very good quality because of the gentle treatment. Since the main amount of the terpenes has already been removed before the carbon dioxide extraction, only comparatively small amounts of carbon dioxide are necessary for the extraction of the important aroma materials.

The following Examples are given for the purpose of illustrating the present invention:

EXAMPLE 1

Obtaining of lemon peel oil concentrate with a low terpene content.

3 kg. of lemon oil with a limonene content of 64.1% was intimately mixed with 1 kg. silica gel at ambient temperature for 90 minutes by stirring. Thereafter, the loaded silica gel was separated from the liquid phase by centrifuging and, in a high pressure extraction plant, subjected to a pre-extraction at 70 bar and 50° C. with 80 kg. carbon dioxide. After removal of the terpene-rich fraction from the separator, the main extraction was carried out at 280 bar and 50° C., the adsorbed aroma materials thereby being extracted from the silica gel with 40 kg. carbon dioxide.

As extract, there were obtained 30 g. of concentrate with a limonene content of 6.7%. The specific carbon dioxide requirement amounted in all to 40 kg. carbon dioxide per kg. of starting oil.

EXAMPLE 2

Obtaining of orange peel oil concentrate with a reduced terpene content.

5 kg. of orange oil with a limonene content of 95.7% were, corresponding to Example 1, stirred with 1 kg. silica gel at ambient temperature for 120 minutes.

Thereafter, the loaded silica gel was separated from the liquid phase by centrifuging and extracted in a high pressure extraction plant with 40 kg. carbon dioxide at 280 bar and 35° C.

As extract there were obtained 625 g. of concentrate with a limonene content of 89.6%. The specific carbon dioxide consumption was 8 kg. carbon dioxide per kg. of starting oil.

EXAMPLE 3

Obtaining of lemon peel oil concentrate with a reduced terpene content.

3 kg. of lemon oil with a limonene content of 64.1% were stirred with 1 kg. active aluminum oxide at ambient temperature for 90 minutes. Subsequently, the loaded aluminum oxide was separated from the liquid phase by centrifuging and subjected to a pre-extraction in a high pressure extraction plant with 30 kg. carbon dioxide at 90 bar and 70° C. After removal of the separated terpene-rich fraction from the separator, the main extraction was carried out at 280 bar and 70° C. and the adsorbed aroma materials extracted from the aluminum oxide with 40 kg. carbon dioxide.

As extract, there were obtained 230 g. of concentrate with a limonene content of 41.9%. The specific carbon dioxide consumption was, in all, 23 kg. of carbon dioxide per kg. of starting oil.

We claim:

1. The method of removing terpenes from a terpene-containing essential oil, which comprises (a) contacting the terpene-containing essential oil with a polar adsorbent such that the adsorbent becomes loaded with essential oil and a liquid phase enriched with terpene is produced, (b) separating the loaded adsorbent from the liquid phase enriched with terpenes, and (c) subjecting the adsorbent loaded with essential oil to an extraction with compressed carbon dioxide.

2. The method of claim 1, wherein the adsorbent is silica gel.

3. The method of claim 1, wherein the adsorbent is aluminum oxide.

4. The method of claim 1, wherein the amount of adsorbent used is 10 to 60% by weight, based on the amount of terpene-containing essential oil contacted in step (a).

5. The method of claim 1, wherein the separation of the loaded adsorbent from the liquid phase is carried out by centrifuging.

6. The method of claim 1, wherein the extracted adsorbent is recycled to step (a).

7. The method of claim 1, wherein the adsorbent is contacted with a terpene fraction from a previous process batch, the mixture of the loaded adsorbent and terpene enriched liquid phase is introduced into a column and, after draining off the liquid phase, passing the essential oil through the column.

8. The method of claim 1, wherein the carbon dioxide extraction is carried out at a pressure of $>70$ bar and at a temperature of 10° to 80° C.

9. The method of claim 8, wherein the carbon dioxide extraction is carried out at a pressure of 200 to 300 bar and at a temperature of 30° to 70° C.

10. The method of claim 1, wherein, before step (c), the loaded adsorbent is subjected to a pre-extraction with compressed carbon dioxide at a pressure of $<100$ bar.

11. The method of claim 10, wherein the pre-extraction takes place at a pressure of 70 to 90 bar and at a temperature of 30° to 80° C.

12. The method of claim 11, wherein the pre-extraction takes place at a temperature of 50° to 70° C.

* * * * *